US006249761B1

(12) United States Patent
Phillips et al.

(10) Patent No.: US 6,249,761 B1
(45) Date of Patent: *Jun. 19, 2001

(54) ASSIGNING AND PROCESSING STATES AND ARCS OF A SPEECH RECOGNITION MODEL IN PARALLEL PROCESSORS

(75) Inventors: Steven Phillips, New York, NY (US); Anne Rogers, Summit, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,379

(22) Filed: Sep. 30, 1997

(51) Int. Cl.[7] .............................. G10L 15/28; G10L 15/14

(52) U.S. Cl. .......................................... 704/231; 704/256

(58) Field of Search .................................... 704/231, 242, 704/251, 256

(56) References Cited

U.S. PATENT DOCUMENTS

| 4,567,606 | * | 1/1986 | Vensko et al. ........................ 704/251 |
| 5,216,748 | * | 6/1993 | Quenot et al. ........................ 704/200 |
| 5,452,459 | * | 9/1995 | Drury et al. ............................... 707/3 |
| 5,459,798 | * | 10/1995 | Bailey et al. ........................... 382/218 |
| 5,581,600 | * | 12/1996 | Watts et al. ........................ 379/88.02 |
| 5,806,032 | * | 9/1998 | Sproat .................................... 704/255 |
| 5,870,735 | * | 2/1999 | Agrawal et al. ........................... 707/3 |

OTHER PUBLICATIONS

John D. Ruley, David Methvin, Tom Henderson, and Martin Heller, "Networking Windows NT 4.0, Workstation and Server," John Wiley & Sons, Inc., New York, 1996, pp i–xviii and 1–40.*

Chin–Hui Lee and Lawrence R. Rabiner, "A Frame–Synchronous Network Search Algorithm for Connected Word Recognition," IEEE Transactions on Acoustic, Speech and Signal Processing, vol. 37, No. 11, Nov. 1989, pp. 1649–1658.*

Fernando C. N. Pereira and Michael D. Riley, "Speech Recognition by Composition of Weighted Finite Automata," AT & T Research Technical Report No. TR 97.18.1(trs/#96), May 29, 1996, pp. 1–24.*

(List continued on next page.)

Primary Examiner—William R. Korzuch
Assistant Examiner—Donald L. Storm
(74) Attorney, Agent, or Firm—Kenyon & Kenyon

(57) ABSTRACT

A continuous, speaker independent, speech recognition method and system recognizes a variety of vocabulary input signals. A language model, which is an implicit description of a graph consisting of a plurality of states and arcs, is input into the system. An input speech signal, corresponding to a plurality of speech frames, is received and processed using a shared memory multipurpose machine having a plurality of microprocessors. Threads are created and assigned to processors, and active state subsets and active arc subsets are created and assigned to specific threads and associated microprocessors. Active state subsets and active arc subsets are processed in parallel to produce a textual representation of the speech signal. Embodiments of the invention include a two-level Viterbi search algorithm to match the input speech signals to context dependent units, an on-demand composition of finite state transducers to map context dependent units to sentences, and a determination whether a particular likelihood calculation needs to be performed or recalled from memory. The on-demand composition of finite state transducers is accomplished by multi-threading the calculation in accordance with the parallel processing feature of the system.

13 Claims, 6 Drawing Sheets

OTHER PUBLICATIONS

Wen, et al., "Efficient Computing Methods for Parallel Processing: An Implementation of the Viterbi Algorithm", Computers Math. Applic., vol. 17, No. 12, pp. 1511–1521, 1989.

Noda, et al., "A MRF–Based Parallel Processing Algorithm For Speech Recognition Using Linear Predictive HMMM", IEEE, pp. I–597–I600, 1994.

Riley, M., et al., "The AT&T 60,000 Word Speech–to–Text System", Eurospeech Conference, 1995.

Mohri, M., et al., "Weighted Automata in Text and Speech Processing," Proceedings of the ECAI 1996 Workshop, pp. 46–56.

* cited by examiner

FIG. 5

```
void proc_frame(Decoder-t* decoder, Frame_t* frame)
{
    int I, me = get_mythreadid();
    RecCost min=WORSTCOST;

update_active_arc_subset(decoder);
    evaluate_active_arc_subset(decoder,frame);
        /* Also, computes this threads contribution to the global
            minimum and stores it is decoder->proc_Min[me] */ barrier ();              /* synchronize all threads */
    cache_reset(decoder);

/* Finish computing global minimum */
    if (me == 0))
        for (i-0; i<nprocs; i++) {
            min = COLLECT(min, decoder->proc_Min[i]);

}
        decoder->threshold = min + decoder->beam;
    } barrier();               /* synchronize all threads */
    record_active_state_updates(decoder);

barrier();               /* synchronize all threads */
    process_active_state_updates(decoder);

```
RecCost likelihood
(RecHMMarray-t*h, int model_num, int id, RecFrame_t*f, int me)
     /* model_num is context-dependent model, id is a state therein */
{
     RecCost cost;
     int ret, ii;

ii = alloc[model_num][id];
     if (mask[ii])        /* bit-vector indicating computed values */
        return like_save[ii]; /* computed value */ cost = WORSTCOST;
     ret = likelihood_calc(model_num, id. f->framedata, cost, me);

if (ret > 0) {
          like_save[ii] = cost;    /* record computed value */
          mask[ii] = 1;            /* and then set bit-vector */
          return cost;
     }
     else {
          fprintf(stderr, "error\n");
          return WORSTCOST;
     }
}
```

```
static int compstate(Comp comp, Tuple tuple)           FIG. 7
{
    int bucket, l, n, me;
    HashList hl, oldhl, newhl;
    HashTable t2n;
    /* look up tuple, the hash key, in the hash table */
    bucket = HFUNC(tuple, t2n->tblsz);
    oldhl = t2n->array[bucket];
    for(hl = oldhl; hl != NULL; hl = hl->next) {
        if(EQTUPLE(hl->tuple, tuple)) {
            n = hl->value;
            break;
        }
    }
    /* did we find it? if not, insert the tuple into the table */
    if (hl == NULL) {
        l = bucket % NUM_LOCKS;
        n = FSMNoState;
        me = get_mythreadid();
        newhl = (HashList) vmalloc(t2n->area[me], sizeof(struct hash_list_rec));
        newhl->creator = me;
        newhl->tuple = tuple;
        /* get the lock for this busket's group */
        ussetlock(t2n->hash_lock[l]);
        /* second lookup tuple again just to make sure that
           it has not appeared since we got the lock */
        for(hl = t2n->array[bucket]; hl != oldhl; hl = hl->next) {
            if(EQTUPLE(hl->tuple, tuple)) {
                n = hl->value;
                break;
            }
        }
        /* if not found, add to bucket */
        if (n == FSMNoState) {
            newhl->next = t2n->array[bucket];
            newhl->value = comp->ns[me];
            t2n->array[bucket] = newhl;
            comp->ns[me] = assign_new_state();
        }
        /* release lock */
        usunsetlock(t2n->hash_lock[l]);
        if (n == FSMNoState)
            n = newhl->value;
        else
            /* tuple was found during the second look-up,
               free the pre-allocated space */
            vmfree(t2n->area[me], newhl);
        /* do some bookkeeping */
    }
    return n;
}
```

FIG. 7B

```
   :
   :
   /* if not found, add to bucket */
   if (n == FSMNoState) {
      newhl->next = t2n->array[bucket];
      newhl->value = comp->ns[me];
      t2n->array[bucket] = newhl;
      comp->ns[me] = assign_new_state();
   }

/* release lock */
   usunsetlock(t2n->hash_lock[1]);

if (n == FSMNoState)
      n = newhl->value;
   else
   /* tuple was found during the second look-up,
      free the pre-allocated space */
      vmfree(t2n->area[me], newhl);

/* do some bookkeeping */
   }
   return n;
}
```

ASSIGNING AND PROCESSING STATES AND ARCS OF A SPEECH RECOGNITION MODEL IN PARALLEL PROCESSORS

BACKGROUND OF THE INVENTION

The present invention relates to speech recognition systems and more particularly to a method and apparatus for recognizing speech using a general purpose shared memory multiprocessor machine.

Speech recognizers, also known as speech-to-text systems or automatic speech recognition (ASR) systems, identify words and produce a textual representation of a received speech signal. In order to accomplish this, typical speech recognizers break down human speech into several distinct layers. A phoneme, for example, is the smallest unit of speech that differentiates utterances in a given language or dialect. However, a single phoneme may be pronounced differently depending on how it is used in a word or depending on the speaker. A context dependent unit is an acoustic realization of a phoneme as manifested in a particular context. These units combine to form words which together combine to form sentences, thereby creating the basic structure of human speech. A language model maps these basic speech sounds into sentences.

A typical speech recognizer includes computer hardware and software which identifies spoken speech signals and evaluates the signal with respect to a language model to obtain a textual representation of what the speaker said. One type of speech recognizer is an isolated word recognition system which requires a speaker to pause after each spoken word so that the recognizer can identify each word in isolation. However, the rate at which speech can be inputted and processed in these recognizers is reduced and using such a system is unnatural to the speaker. Another type of speech recognizer is a continuous speech recognition system which allows a user to speak normally with no pauses in-between words. A continuous speech system allows a more natural speech flow, but because it is more difficult to distinguish where a particular word ends and where the next word begins, a continuous speech recognition system and the algorithm running on this type of system are complex.

A language model and a speech signal are inputted into a recognizer. A language model consists of, for example, one or more models of context dependent units having probability distributions associated therewith, models that map context dependent units to words, and models that map words to sentences. The speech signal is partitioned into a plurality of speech frames which may contain a portion of or a complete phone. Each frame is evaluated with respect to a subset of the context dependent phone models. The results of this process are then used to progress through the higher levels of the language model. This process continues until the recognizer processes all the speech frames in an utterance. Because of the number of calculations, associated complex processing, and the need to run in a real-time environment, existing speech recognizers are limited to isolated word recognition or sacrifice accuracy to obtain real-time performance. In addition, current speech recognizers have models that are hard-coded into the system making speech recognition possible for only limited vocabularies.

Special-purpose machines allow speech recognizers to achieve real-time or near real-time processing capability. Some special-purpose machines have been built that are specially designed to take advantage of parallelism to do speech recognition. An example is described in K. A. Wen and J. F. Wang, "Efficient computing methods for parallel processing: An implementation of the Viterbi algorithm," Computers Math. Applic., 17 (12) 1989, pages 1511–1521. However, these machines are not suitable for recognition of large-vocabulary continuous speech because they do not have the necessary generality to accommodate these large vocabularies. A drawback associated with these special purpose machines is that they are hard-coded with a particular language model and therefore can only be used for a particular recognition task. Another disadvantage with these systems is that they are designed only for isolated word recognition and are not suitable for continuous speech recognition. Moreover, none of these systems has the flexibility for receiving a language model as an input that is composed of a number of layers which are combined on-the-fly or implicitly during recognition. Therefore, none of these special-purpose machines can be used for general-purpose recognition of large-vocabulary continuous speech. In addition, special-purpose machines are prohibitively expensive, and are usually limited to development by large corporations making accessibility to the general public virtually impossible.

With the advancements in commercially available multi-processor systems, there is an opportunity to develop a continuous speech recognition system that uses a general purpose shared memory multiprocessor machine to perform continuous parallel speech recognition. There is also a need for a parallel speech recognizer that is capable of receiving a language model as an input so that much larger vocabularies as well as complex speech patterns can use the same underlying programming algorithm used for standard speech recognition tasks without requiring hard coding of a particular model.

SUMMARY OF INVENTION

The present invention meets the needs and avoids the disadvantages and drawbacks of existing speech recognition systems by providing a speaker independent continuous speech recognition method for recognizing a variety of speech inputs in real time. A signal corresponding to a plurality of speech frames is received. A language model is received in a general purpose shared memory machine having a plurality of processors. The language model is an implicit description of a graph consisting of a plurality of states and arcs. The graph and the speech input are processed in parallel using the plurality of processors.

BRIEF DESCRIPTION OF THE DRAWINGS

FIG. 5 is sample high-level code for processing a frame in the present invention.

FIG. 6 is sample high-level code illustrating the likelihood calculation in the present invention.

FIG. 7 is sample high-level code illustrating the handling of the hash table for multi-threading the composition of the FSM portion of the algorithm.

DETAILED DESCRIPTION

The parallel speech recognizer in accordance with the present invention utilizes a sequential recognizer. By using a sequential recognizer, improvements made in sequential speech recognition, such as phone modeling, likelihood calculations, grammar representations, etc., can be applied to the parallel :recognizer of the present invention. Accordingly, the present invention utilizes the two-level Viterbi search algorithm as described in C. H. Lee and L. R. Rabiner, "A Frame-Synchronous Network Search Algorithm for Connected Word Recognition", IEEE Transactions on Acoustics, Speech, Signal Processing, Vol. 37, No. 11, November 1989. The two-level Viterbi search algorithm operates at the boundary between the Hidden Markov Model (HMM) layer where signals representing speech frames are matched with HMM's that represent context dependent units as well as an upper layer which represents the mapping of context dependent units to sentences. The mapping of context dependent units to sentences is done using on-demand composition of Finite State Transducers (FSM) as described in Mohri et al., "Weighted Automata in Text and Speech Processing", Proceedings of the ECAI 96 Workshop, ECAI, 1996.

Figure 1:
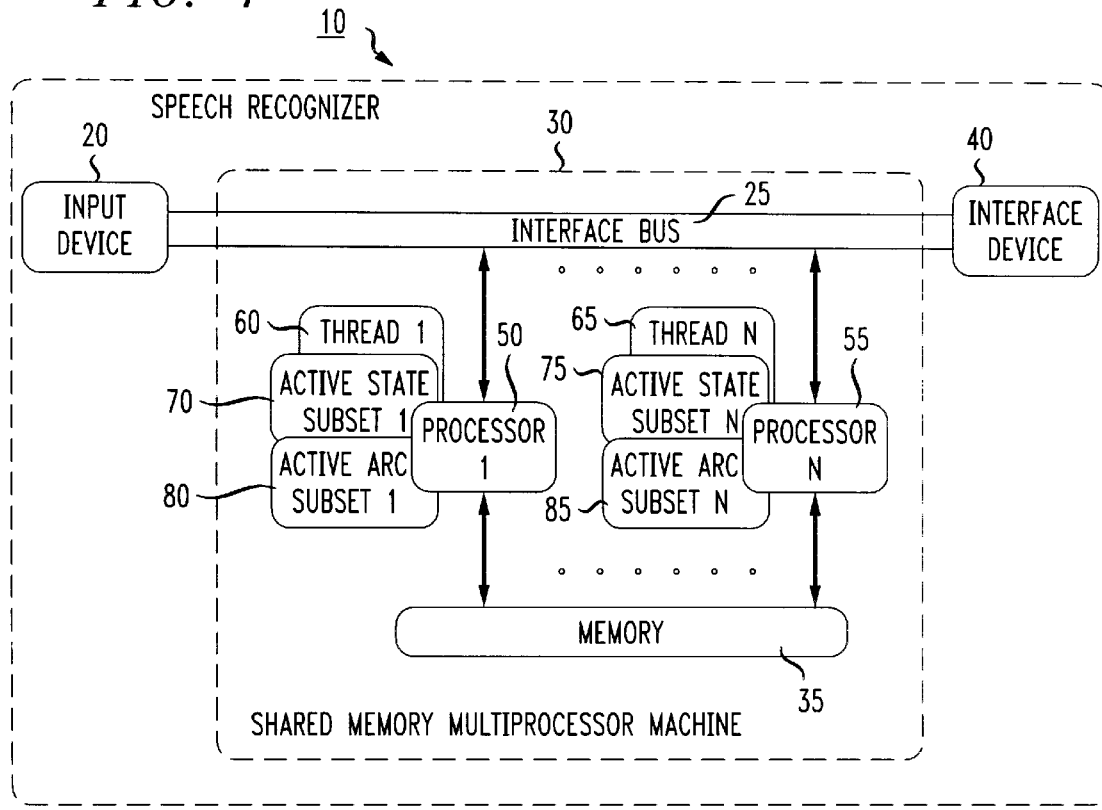
FIG. 1 is a general block diagram of a speech recognizer in an embodiment of the present invention.

FIG. 1 is a general block diagram of a parallel speech recognizer 10 in accordance with the present invention and is used to illustrate the processing relationship between multiple processors 1, 2–N and a shared memory 35. An input speech signal, in analog form, is received by an input device 20. The input signal is digitally sampled, for example every 10 milliseconds, which may occur at the input device 20 in machine 30 or by an alternative receiving device (not shown). Each sample undergoes spectral analysis and other forms of signal processing known in the art resulting in a parametric representation of the input signal as a frame or vector of real numbers. A language model is also inputted to recognizer 10. The language model contains models of the basic speech units and an implicit description of a graph, consisting of states and arcs, that serves to map basic speech units to sentences. The recognizer in accordance with the present invention is capable of receiving different language models and is not limited to one particular model as found in prior special-purpose parallel recognizers. The language model used can, for example, be made-up of: one or more models of context dependent units which have probability distributions associated therewith; models that map context dependent units to words; and models that map words to sentences.

A shared memory multiprocessor machine 30, used to parallel process the Viterbi search algorithm includes, at its most basic level, an interface bus 25, microprocessors 1(50), 2–N(55) and memory 35. The speech algorithm is housed within multiprocessor machine 30 and run in parallel using processors 1,2–N to produce a representation of the signal received on line 15. As will be clear from the description and processing results described below, the number of microprocessors 1, 2–N, employed in machine 30 effects the speed and efficiency of the speech recognizer in processing received input signals. Once the input signals have been processed by the recognizer, the output is received by interface device 40. The outputs can be transmitted to a display apparatus, speech understanding tool or further processed depending upon the eventual use of the output. The machine 30, in accordance with the present invention, is a general purpose shared memory machine having a plurality of processors. Machine 30 is considered a general purpose machine in that it does not require hard-wiring or hard-coding for a particular type of language model or algorithm. In this manner, the recognizer is capable of processing increased vocabulary sizes by inputting different language models unlike prior parallel speech recognizers which used hard-wired special purpose machines to parallel process speech algorithms.

Figure 2:
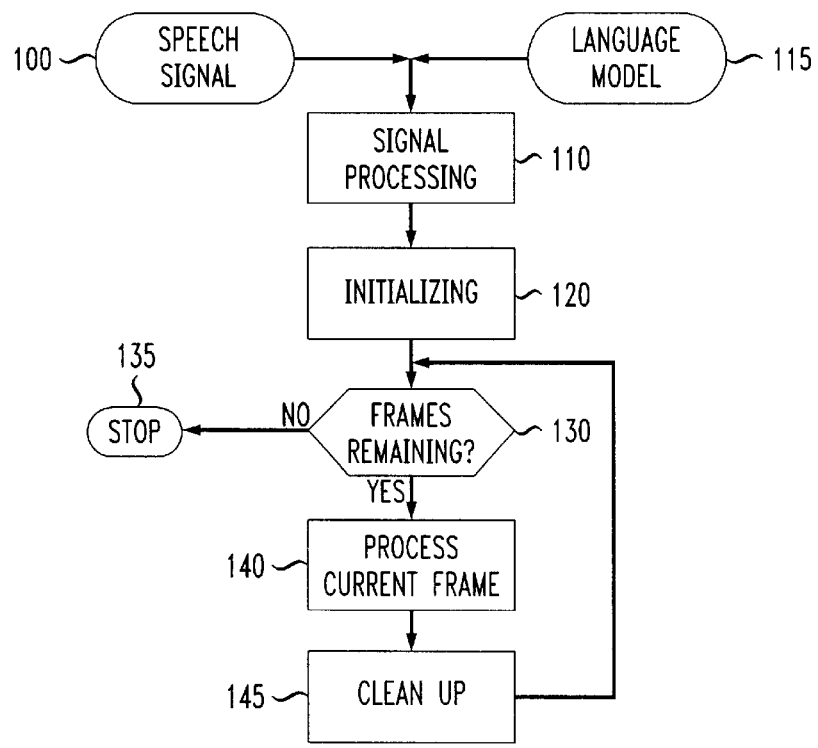
FIG. 2 shows a general flowchart illustrating the method in accordance with the present invention.

The speech recognition system according to the present invention maps between an input speech waveform, context dependent units, words and sentences to produce a textual representation of the input signal. This general process flow is best illustrated in FIG. 2. A speech signal at step 100 is inputted to a signal processor at step 110. The signal may be an analog signal in which case the signal processor digitally samples the signal and produces a frame or vector of real numbers. A language model is also inputted at step 115 where the model is an implicit description of a graph consisting of a plurality of states and arcs. The system is initialized at step 120 and a determination is made, at step 130, if any speech frames remain to be processed by the system. If no frames remain, the process is complete and the process terminates at step 135. If there are remaining speech frames to be processed by the recognizer, the process continues to step 140 where each frame is processed in parallel in multiprocessor machine 30. At step 145, a cleanup step is performed to validate that the processing for a particular frame assigned to a thread is complete and the process returns to step 130 and continues for subsequent frames. In this manner, the recognizer processes input speech frames sequentially, however, the processing associated with each frame is performed in parallel as will be described in detail below.

Figure 3:
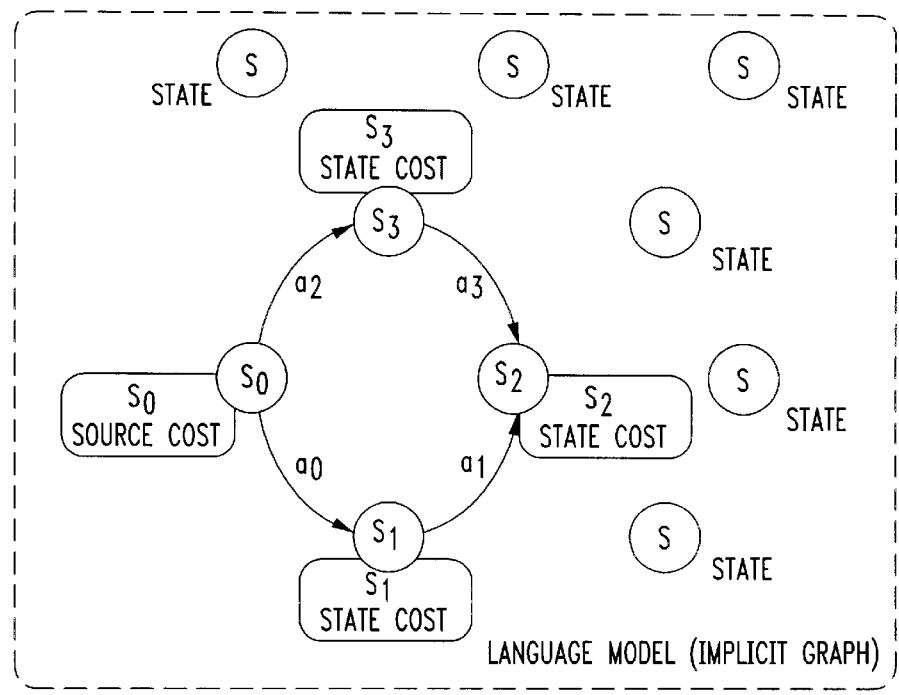
FIG. 3 is a portion of an implicit graph used in accordance with the present invention.

Turning briefly to FIG. 3, which illustrates an example of a portion of an implicit graph used in the present invention, each state $S_0$ and $S_1$ in the language model has associated therewith a plurality of incoming arcs, illustrated for example by arc $a_0$ and outgoing arcs illustrated for example by arc $a_1$. The state $S_1$ from which arc $a_1$, originates is referred to as the source state and arc $a_1$, which flows from the source state $S_1$, is referred to as an outgoing arc. The number of states and arcs in the implicit graph has been limited to these few for explanation purposes only.

Figure 4:
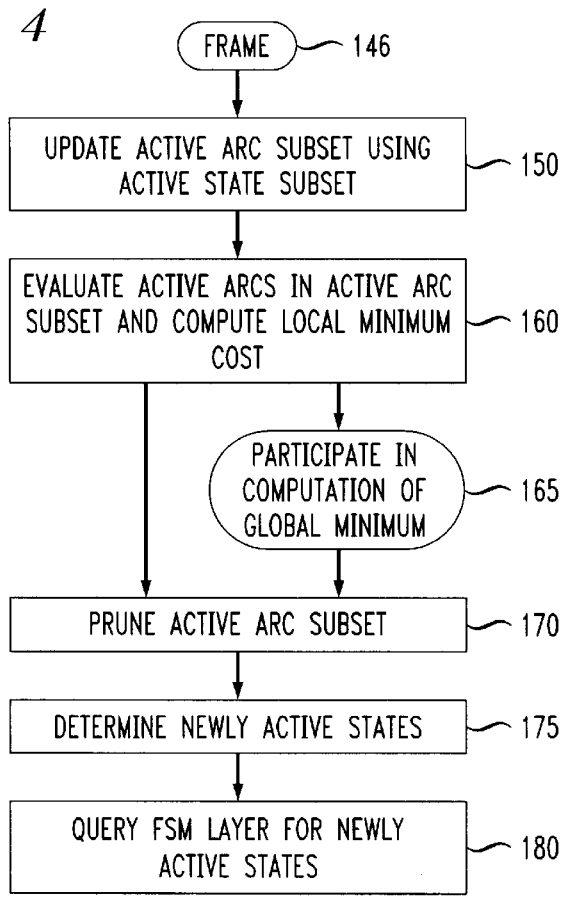
FIG. 4 is a more detailed flowchart illustrating the processing of arcs and states.

In FIG. 4, a speech frame at step 146 is mapped to the input language model having a plurality of states and arcs. Initially, the active arc list is empty and the active state list contains only the start state of the graph. Each thread in the multi-processor configuration is assigned a subset of the active state set. This allocation of states determines the structure of the parallel algorithm. Each thread will process approximately N/P states where N is the number of active states and P corresponds to the number of processors. Each state is assigned to a single thread which is determined by taking the state number mod P. The active arcs originating from an active state are assigned to the same thread as the associated state. In this manner, a particular thread 60,65 processes an active state subset 70,75 as well as its associated active arc subset 80,85 to take advantage of the multiprocessor parallel configuration. This technique enhances data locality.

At step 150, the active arc set is updated based on the active states from the graph. Each thread performs the likelihood calculation for each arc assigned to that particular thread as depicted at step 160. Each thread computes the minimum cost for its active arc subset at step 160 and participates in the computation of the global minimum cost at step 165. For example, this is done through the use of a vector that stores the maximum likelihood for each thread as well as using a sequential loop to compute the final minimum cost value. FIG. 5 illustrates sample high level code for processing a frame.

The calculation for determining the minimum cost at step 160 is best explained with reference to FIG. 3. As previously stated, the process calculates the likelihood costs of the active arcs, for example in FIG. 3 arcs $a_0$ and $a_1$. The state costs associated with states $S_1$ and $S_3$ and the likelihood costs associated with arcs $a_1$ and $a_3$ have already been calculated. A cost associated with arc $a_1$ is determined by adding the likelihood cost of arc $a_1$ and the state cost for state $S_1$ which is a source state for arc $a_1$. The state cost for state $S_2$ is calculated by determining the minimum of the costs of the incoming arcs $a_1$ and $a_3$ associated with state $S_2$. The local minimum cost for the thread is the minimum cost over all the states reached by arcs in the active arc subset for that thread.

The procedure for calculating likelihoods avoids recomputing the likelihood of a frame matching a particular context dependent unit by remembering the calculations that it has performed in the past. This technique, which is known in the art as "memo-ization" or "caching," reduces the cost of computing multiple likelihoods. It is implemented using a bit vector that indicates whether a particular likelihood has been calculated and a result vector that holds previously computed likelihoods. To multi-thread the likelihood calculation, the present invention takes advantage of a property of the computation, namely that the calculation of a particular likelihood will always produce the same value, and a property that many shared memory machines employ, namely that writes from a single thread are seen in order by other threads. Together these properties allow the present algorithm to avoid using any synchronization for the memoization vectors even though there is technically the potential for interference between two computations of the same likelihood. The first property guarantees that even if multiple threads try to compute the same likelihood concurrently, they are guaranteed to write the same value into the result vector. The second property, combined with a careful ordering, writes to the vectors (in particular, writing the result into the result vector before setting the bit in the bit vector) guarantees that if a computation finds a one in the bit vector, then it is guaranteed to find the correct likelihood in the result vector. FIG. 6 illustrates an example of high-level code for performing the likelihood calculation in accordance with the present invention.

The arcs with costs that are not within the range of the minimum cost determined in step 165 of FIG. 4 plus a predetermined threshold value, which is an input to the recognizer, are pruned at step 170. Each thread goes through the active arcs assigned to it pruning the arcs if their associated costs fall outside the computed range. The new active states are determined at step 175 using the results from step 170. An arc is completed if the likelihood calculation for the most recent frame determines that there was a match with the underlying context dependent unit and the arc's cost is within the computed range. Step 175 adds the destination states of completed arcs to the active state set. In addition, the FSM layer is queried at step 180 to determine the transitions out of newly active states using on-demand composition of the FSMs.

Because the active arc calculations are assigned to a particular thread based on the state from which they originate, the thread that determines that a particular state becomes active may not be the thread that is assigned to that next state. This computation is performed by first storing the states which an arc designates as active. This storage data structure is in the form of a two dimensional array wherein each element in the array contains a linked list. A state "S" is added to the linked list at location [T, S mod P] in the array by Thread T, if that thread identifies the state as newly active. Once this data structure is built, a thread, "T", queries the FSM layer for the states in the lists at locations [1 . . . P, T] of the array and adds them to its active state subset.

The multi-threading of the FSM library is centered on the routines for on-demand composition of automata. Two or more automata are combined to produce a composed automation, whose states correspond to tuples with a tuple containing one state from each of the input automata. These routines make use of a hash table which maps from tuples of states to state numbers in the composed automation. However, different threads need to update the hash table simultaneously which requires careful synchronization to avoid data contention. Locking access to the hash table as a whole is an inadequate solution, as too much time would be spent waiting for the lock. Instead, the present invention uses one lock to manage a small collection of hash buckets which increases contention slightly, but decreases substantially the number of locks required in comparison to a one-lock per bucket implementation. Reordering the code to minimize the amount of time any thread holds a bucket lock further reduces contention of the hash table. FIG. 7 illustrates high-level code for handling the hash table for multi-threading the composition of the FSMs portion of the algorithm.

The following results were achieved using the algorithm of the present invention on a Silicon Graphics Power Challenge XL multiprocessor, however the principles of the invention can be implemented on any shared memory machine having a plurality of microprocessors. Table 1 illustrates the average run time over 300 sentences for the 20,000 word Advanced Projects Research Agency (ARPA) North American Business News (NAB) task.

| Number of Processors | Sequential | 1 | 2 | 4 | 8 | 12 | 16 |
|---|---|---|---|---|---|---|---|
| Average Run Time | 35.1 | 33.7 | 20.4 | 12.3 | 8.4 | 7.8 | 7.6 |
| Increase Speed Over Sequential | 1.0 | 1.0 | 1.7 | 2.8 | 4.2 | 4.5 | 4.6 |
| Relative to Real-Time | 3.9 | 3.7 | 2.3 | 1.4 | 0.9 | 0.9 | 0.8 |

The column labeled Sequential contains the run times using a sequential recognizer on one processor of the Power Challenge XL. Columns labeled 1, 2, 4, 8, 12 and 16 denote the results from using the indicated number of processors. The run time for the parallel recognizer in accordance with the present invention using 8 processors provides real-time performance. As can be seen from Table 1, the recognition speed drops off as more processors are used which is due, in part, by synchronization at locks on shared data structures and at barriers between phases of the Viterbi algorithm. The response time improvements with respect to previous sequential algorithms are achieved based on the parallelization of the Viterbi search, likelihood calculations and the on-demand FSM composition.

The speech recognition system in accordance with the present invention uses a general purpose shared memory multiprocessor machine to perform continuous parallel speech recognition. The system receives a language model as an input thereby accommodating larger vocabularies and complex speech patterns while using the same underlying algorithm.

What is claimed is:

1. In a speech recognition system, a method for recognizing a variety of speech inputs using a language model having a plurality of active states, said method comprising the steps of:

partitioning said plurality of active states to create one or more active state subsets, each of said subsets including a number of active states;

assigning each of said active state subsets to one or a plurality of microprocessors included in a multiprocessor shared memory machine;

determining active arcs associated with said plurality of active states:

assigning said active arcs to a particular processor based on said assignment of active state subsets;

performing a likelihood calculation for each of said active arcs;

pruning said active arcs based on said likelihood calculation such that said arcs having a likelihood calculation within a computed range are included in an active arc subset;

determining whether a likelihood calculation associated with an active arc has previously been performed;

storing the result of said likelihood calculation associated with an active arc in a memory in parallel; and producing a textual representation of said speech input based on the processing of said active states and active arcs by said plurality of microprocessors.

2. The method of claim 1 wherein the step of performing likelihood calculations for each of said active arcs is performed in parallel using at least two or more of said processors.

3. The method of claim 2 further including the step of updating said active arc subset with active arcs that remain after said pruning.

4. The method of claim 3 further including the step of creating a new active state subset based on said updated active arc subset.

5. The method of claim 4 wherein said step of creating a new active state subset is performed in parallel using at least two or more of said processors.

6. The method of claim 1 further including the step of determining the transitions from said active states using an on-demand composition of finite state transducers.

7. The method of claim 6 further including the step of multi-threading said finite state transducers.

8. In a speech recognition system having a shared memory multiprocessor machine, a method for recognizing a variety of speech inputs, comprising:

receiving a speech signal having a plurality of speech frames;

receiving a language model having a plurality of states and a plurality of arcs;

creating at least one processing thread for each processor in said multiprocessor machine;

creating a plurality of active state subsets from said plurality of states, and a plurality of active arc subsets from said plurality of arcs;

assigning each of said plurality of active state subsets to a different processing thread, and each of said plurality of active arc subsets to a different processing thread;

processing said plurality of active state subsets and said plurality of active arc subsets in parallel using said multiprocessor machine; and producing a textual representation of said speech signal based on the processing of said plurality of active state subsets and said active arc subsets.

9. The method of claim 8, wherein said processing includes:

updating said plurality of active arcs subsets based on said plurality of active state subsets;

evaluating each of said active arc subsets;

pruning each of said active arc subsets;

updating said plurality of active state subsets based on said step of pruning; and determining transitions out of newly active states within said plurality of active state subsets.

10. The method of claim 9, wherein said evaluating includes:

calculating a likelihood cost for each active arc within each of said active arc subsets and storing the likelihood cost in a memory in said shared memory machine;

calculating a maximum likelihood and a minimum cost for each of said active arc subsets; and calculating a global minimum cost for said active arc subsets.

11. The method of claim 10, wherein said calculating a likelihood cost for each active arc includes:

determining whether said likelihood cost has been previously calculated; and retrieving said likelihood cost from said shared memory, if so determined.

12. The method of claim 9, wherein said pruning includes:

excluding, from each of said active arc subsets, each active arc whose likelihood cost falls outside a predetermined range; and including, within each of said active arc subsets, each active arc whose likelihood cost falls inside the predetermined range.

13. The method of claim 9, wherein said determining includes:

on-demand composition of automata using synchronous access to a hash table, said hash table mapping tuples of states to state numbers in the composed automation.

* * * * *